Patented Apr. 6, 1926.

1,580,062

UNITED STATES PATENT OFFICE.

ARTHUR LÜTTRINGHAUS, OF MANNHEIM, HEINRICH NERESHEIMER, OF LUDWIGSHAFEN-ON-THE-RHINE, AND HANS EMMER, OF MANNHEIM, GERMANY, ASSIGNORS TO BADISCHE ANILIN- & SODA-FABRIK, OF LUDWIGSHAFEN-ON-THE-RHINE, GERMANY, A CORPORATION OF GERMANY.

PROCESS OF MANUFACTURING VAT COLORING MATTERS.

No Drawing.   Application filed November 11, 1924. Serial No. 749,318.

*To all whom it may concern:*

Be it known that we, ARTHUR LÜTTRINGHAUS, HEINRICH NERESHEIMER, and HANS EMMER, citizens the first and third of the German Empire and the second of the Kingdom of the Netherlands, residing the first and third at Mannheim and the second at Ludwigshafen-on-the-Rhine, Germany, have invented new and useful Improvements in Processes of Manufacturing Vat Coloring Matters, of which the following is a specification.

Benzanthrone, as is known, is converted into dibenzanthrone by treatment with caustic alkali. The isomeric body, isodibenzanthrone has been obtained by acting with alkaline condensing agents on $B_z$-1-halogen-benzanthrones; see U. S. Patent 906,367.

We have now made the surprising discovery that the valuable isodibenzanthrone can be obtained directly from benzanthrone by treating it with alkali alcoholate so as to make the formation of dyestuff complete, or substantially so. Alkali alcoholate is most preferably used in mixture with alkali metal hydroxid, and an indifferent diluent may also be employed for performing the reaction desired. Generally, a mixture of isodibenzanthrone with varying amounts of dibenzanthrone is produced thereby, the percentage ratio of either dyestuff being dependent on the conditions of working, chiefly temperature and kind of alcohol used in each special case, and the mixture can be employed as such, or separated into the single dyes without difficulty. Such separation takes place preferably after a purification of the mixture, and can be effected, for example by treatment with alkaline hydrosulfite solution in a suitable manner, so that the dibenzanthrone which is more easily soluble in the state of a hydrocompound, goes into solution, while the isodibenzanthrone is left behind as such or as a hydrocompound, or leuco salt, in a very pure condition.

In order to further illustrate the invention and the manner of carrying it into effect, the following examples are given, to which however the invention is not confined. The parts are by weight.

*Example 1.*

Introduce 10 parts of benzanthrone, purified by sublimation, into a molten mixture of 25 parts of methanol and 40 parts of caustic potash, at a temperature of 170 degrees centigrade and while stirring. The melt is then kept at between 170 degrees and 180 degrees centigrade for 2 hours. When cool, the melt is dissolved in water, the solution boiled while exposed to the air, and the vat coloring matter separated, comprising isodibenzanthrone, filtered off, washed and dried.

When carrying out the melt at a higher temperature, the mixed coloring matter produced is the poorer in isodibenzanthrone, the higher the temperature of the melt. Likewise, when using lower temperatures for the melt, the formation of the more valuable isodibenzanthrone is growing smaller and the production of dibenzanthrone and 2.2'-dibenzanthronyl is more and more favored.

The raw coloring matter can be purified by dissolving 10 parts of it, in a powdery state, in 100 parts of sulfuric acid of 66 degrees Baumé at about 90 degrees or 95 degrees centigrade. 15 parts of water are then slowly introduced while maintaining a temperature of 95 degrees or 100 degrees centigrade, whereupon the dyestuff precipitated is filtered off by means of a stone filter at 100 degrees centigrade and washed with sulfuric acid containing water in about the aforesaid proportion.

In case the isodibenzanthrone is desired to be obtained in a pure state from the mixed dyestuff, this can be done, for example, by heating 10 parts of the dyestuff, after purification and in a condition of a paste, with 200 parts of water and 40 parts of caustic soda solution of 30 degrees Baumé to 60 degrees centigrade, introducing 4 parts of dry anhydrous sodium hydrosulfite, stirring for about 10 minutes, allowing to cool to about 40 degrees centigrade and filtering off. The aforedescribed treatment is repeated once or twice in the same manner, if necessary. The undissolved part of the product corresponds with the known isodibenzanthrone—see U. S. Patent 906,367—in all its properties. The dissolved part is separated from the vats obtained by means of a current of air. It is identical with dibenzanthrone, see U. S. Patent 818,992.

*Example 2.*

10 parts of sublimed benzanthrone are introduced into a mixture of 40 parts of caustic potash and 30 parts of normal-butyl alcohol, heated to from 210 degrees to 215 degrees centigrade and stirred for several hours at the same temperature. The melt is dissolved in water and the alcohol driven off by steam distillation. The raw dyestuff can be purified and, if desired, separated into its constituents, as described in the foregoing examples.

*Example 3.*

40 parts of powdered caustic potash and 40 parts of ethyl alcohol are gradually heated to 170 degrees centigrade while stirring and distilling off 20 parts of alcohol. 10 parts of sublimed benzanthrone are then introduced at the same temperature. Subsequently stirring is continued for 1 or 2 hours while maintaining the temperature, and the mass is then worked up in the manner described. The dyestuff, after purification, contains between about 70 and 80 per cent of isodibenzanthrone which percentage diminishes when the temperature of the melt is kept higher or lower as indicated. Isodibenzanthrone can be separated from the product in the manner set forth.

*Example 4.*

30 parts of isopropyl alcohol are mixed with 40 parts of caustic potash whereupon the temperature is gradually raised to 160 degrees or 165 degrees centigrade, while distilling off about 10 parts of isopropyl alcohol. After cooling the melt to between 115 degrees and 145 degrees centigrade, 10 parts of sublimed benzanthrone are introduced and heating is continued for 1 or 2 hours. The dyestuff obtained after purification contains up to 90 per cent of isodibenzanthrone.

Other alcohols can be used instead of the named ones. The conditions most favorable to a maximum yield of isodibenzanthrone vary, depending on the alcohol employed.

What we claim is:

1. The process of making a vat coloring matter which consists in acting on benzanthrone with alkali metal alcoholate at such high temperatures that the benzanthrone is substantially completely converted into dyestuff.

2. The process of manufacturing a vat coloring matter containing isodibenzanthrone which consists in acting on benzanthrone with alkali metal alcoholate at such high temperatures that the benzanthrone is substantially completely converted into dyestuff.

3. The process of manufacturing isodibenzanthrone which consists in acting on benzanthrone with alkali metal alcoholate and alkali metal hydroxid at such high temperatures that benzanthrone is substantially completely converted into dyestuff and purifying the product.

4. The process of manufacturing isodibenzanthrone which consists in acting on benzanthrone with alkali metal alcoholate and alkali metal hydroxid at such high temperatures that the benzanthrone is substantially completely converted into dyestuff and separating the isodibenzanthrone from dibenzanthrone with the aid of alkaline hydrosulfite solution.

5. As a new article of manufacture, a vat coloring matter containing dibenzanthrone and isodibenzanthrone, soluble in concentrated sulfuric acid with a color between violet and green and producing dyeings, from the vat, of a more reddish cast than dibenzanthrone, and when lixiviated with hot alkaline hydrosulfite solution leaving a difficultly soluble residue behind which produces more reddish dyeings than the part dissolved by the hydrosulfite treatment.

In testimony whereof we have hereunto set our hands.

ARTHUR LÜTTRINGHAUS.
HEINRICH NERESHEIMER.
HANS EMMER.